United States Patent [19]

Rossmere et al.

[11] Patent Number: 5,333,118
[45] Date of Patent: Jul. 26, 1994

[54] FLEXIBLE COMPUTER CONTROLLED NON-LINEAR TRANSFORM GENERATOR

[75] Inventors: David Rossmere; O. F. Morgan, both of San Jose; Michael Polatnick, Oakland, all of Calif.

[73] Assignee: Sony Electronics, Inc., Park Ridge, N.J.

[21] Appl. No.: 826,094

[22] Filed: Jan. 27, 1992

[51] Int. Cl.⁵ .................................... G06F 15/332
[52] U.S. Cl. .................................... 364/725
[58] Field of Search ........................ 364/725–726

[56] References Cited

U.S. PATENT DOCUMENTS 4,446,530  1/1984  Tsuboka ..................... 364/725

*Primary Examiner*—Tan V. Mai
*Attorney, Agent, or Firm*—Irell & Manella

[57] ABSTRACT

A flexible computer controlled non-linear transform generator is disclosed which employs a random access memory (RAM) lookup table (LUT) having programmable controlled address and data paths and an address multiplexer which is programmed to dynamically control LUT loading and live data transformation. A MASK register is programmed to dynamically modify the number of banks of memory in the LUT, an ADDRESS SELECT register is programmed to set the access mode of for the LUT—either random access mode, auto-increment mode, or live data mode, a BIT WIDTH register is programmed to set the width of the data stored in the LUT, and a BASE ADDRESS register is programmed with the starting address for loading the LUT in auto-increment mode. During live data transformation, a digitized input signal is used to address the LUT, while the contents of the LUT at the addressed location provides a digitized output signal according to a predefined transfer function. During LUT loading, transform data for different transfer functions may be stored in different banks of the LUT. Thereafter during live data transformation, the transform generator's transfer function can be quickly changed by reprogramming the MASK register to switch LUT banks.

27 Claims, 2 Drawing Sheets

FLEXIBLE COMPUTER CONTROLLED NON-LINEAR TRANSFORM GENERATOR

BACKGROUND OF THE INVENTION

1. Field of the Invention:

This invention relates to circuits used to transform digitized signals. More particularly, this invention relates to hardware lookup tables used to transform digitized signals.

2. Related Applications:

The present application is related to the following U.S. patent applications Ser. No. 07/846,675, filed on Mar. 5, 1992, entitled Automatic Determination of Processing Parameters for Digitized Signal Correctors in a Digital Image Processing System to Achieve Specified Output Results; U.S. Pat. No. 5,210,711, issued May 11, entitled A Very Fast Variable Input Multibit Adder; Ser. No. 07/854,367, filed on Mar. 19, 1992, entitled Hardware Implementation of an HDTV Color Corrector.

3. Art Background:

A common method of transforming a digitized signal is to employ a hardware lookup table. A hardware lookup table is a digital memory that is pre-loaded with the appropriate transform data to perform the desired transformation. The lookup table stores transform function values for the range of input digitized signal values. The transform data is stored in the lookup table such that f(x) is stored at address x, where f is the desired function and x is the input signal. After the lookup table has been loaded with the appropriate transform data, the input digitized signal, x, is coupled to the address input of the lookup table, and the data output of the lookup table provides the transformed digitized signal f(x).

Past lookup table designs for transforming digitized signals have several limitations. Past designs using random access memory (RAM) lookup tables are not well-suited to changing the transfer function of the lookup table in real time. This is particularly true for large RAM lookup tables, since the larger the RAM, the more time required to load data into the RAM. Also, loading RAM lookup tables with functions having variable bit width required that a central processor track the lookup table address during data loading. The extra time required to maintain the lookup table address during loading made switching of transfer functions time consuming.

As will be described, the present invention provides a flexible computer controlled non-linear transform generator that employs a lookup table (LUT) having programmable controlled address and data paths. The LUT is dynamically configured into one or more banks for storing data for one or more functions, wherein the transform function is changed in real time by switching LUT banks under program control. Moreover, an auto increment load feature used in conjunction with the programmable address and data paths speeds transform data loading.

SUMMARY OF THE INVENTION

A flexible computer controlled non-linear transform generator is disclosed which employs a lookup table (LUT) having programmable controlled address and data paths to provide real time switching between transfer functions. Moreover, the present invention provides means to simplify system software for fast loading of transform data, and an alternative embodiment provides for non intrusive loading of transform data.

Functionality of the transform generator of the present invention is divided into two areas; LUT loading, and live data transformation. During LUT loading, transform data for different transfer functions is stored in different banks of the LUT under program control. Thereafter during live data transformation, a digitized input signal is used to address the LUT, while the contents of the LUT at the addressed location provides a digitized output signal according to the predefined transfer function. During live data transformation, the transform generator's transfer function can be changed in real time by programmably switching LUT banks.

The transform generator of the present invention is comprised primarily of a RAM lookup table, a bi-directional buffer, and an address multiplexer. The address and data paths of the transform generator are dynamically controlled by programming a set of registers contained in the address multiplexer. The address multiplexer is programmed by receiving addresses and data from an external source. For example, the transform generator could be coupled to the address and data busses of a central processing unit (CPU). The CPU can then be used to program internal registers of the address multiplexer, and supply transform data for storage in the LUT.

The address multiplexer has four programmable registers that control access to the LUT. A MASK register is used to dynamically modify the number of banks of memory comprising the LUT. An ADDRESS SELECT register is programmed to set the access mode for the LUT; either random access mode, auto-increment mode, or live data mode. A BIT WIDTH register is programmed to set the width of the data stored in the LUT. A BASE ADDRESS register is programmed with the starting address for loading the LUT in auto-increment mode.

The random access and auto-increment access nodes are used to load transform data into the LUT in order to implement one or more predefined transfer functions. During random access and auto-increment modes, the LUT can be dynamically configured into one or more banks for storing transform data for one or more functions. The auto increment mode simplifies system software by automatically generating an updated LUT address for loading of transform data, which obviates the need for system software to generate and maintain a LUT address.

The transform generator of the present invention performs a non-linear transform on any digital input signal based on either static or dynamic criteria. Applications for the non-linear transform generator of the present invention include color alteration, encryption/encoding, data masking and arithmetic non-linear transformation. For a discussion of applications, see Ser. No. 07/854,367, entitled Hardware Implementation of an HDTV Color Corrector.

DETAILED DESCRIPTION OF THE INVENTION

A flexible computer controlled non-linear transform generator is disclosed which has numerous applications in data and image processing systems. The transform generator of the present invention employs a lookup table (LUT) having programmable controlled address and data paths. The transform generator performs a non-linear transform on any digitized input signal based on either static or dynamic criteria. In the following description, for purposes of explanation, specific circuit devices, circuit architectures, and components are set forth in order to provide a more thorough understanding of the present invention. However, it will be apparent to one skilled in the art that the present invention may be practiced without these specific details. In other instances, well known circuits and devices are shown in schematic form in order not to obscure the present invention unnecessarily.

Figure 1:
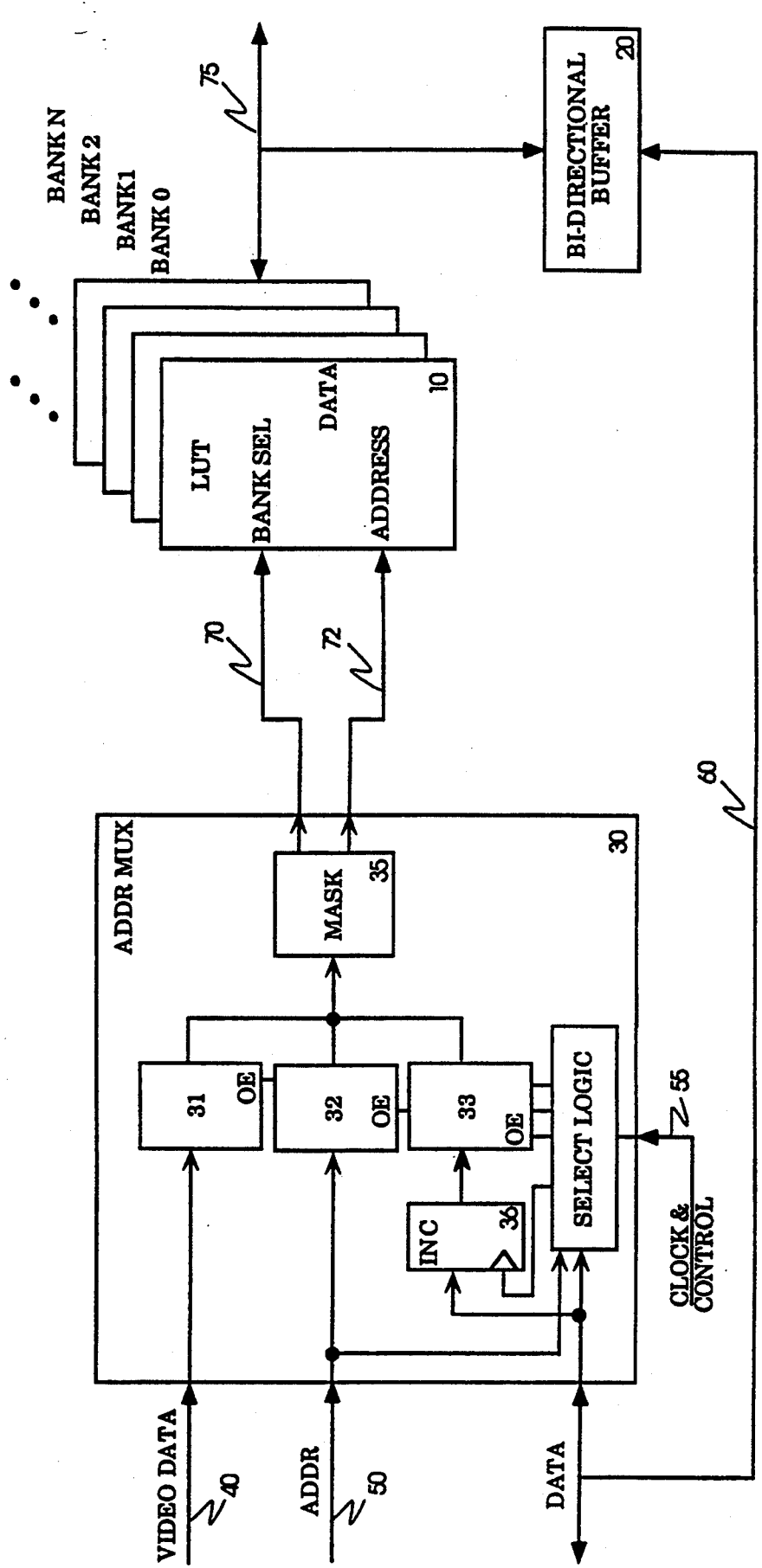
FIG. 1 is a block diagram illustrating the flexible computer controlled non-linear transform generator of the present invention.

FIG. 1 provides a block diagram of the transform generator of the current embodiment of the present invention. The transform generator is comprised primarily of RAM lookup table 10, bi-directional buffer 20, and address multiplexer 30. LUT 10 is coupled to receive bank select 70 and address 72, and is coupled to transmit and receive over data path 75. Bi-directional buffer 20 provides for transferring data between data path 75 and data bus 60. Data path 75 serves the dual purpose of providing a transformed output signal and providing a path for reading and writing the contents of LUT 10.

The address and data paths of the transform generator of the present invention are dynamically controlled by programming a set of registers contained in address multiplexer 30. Address multiplexer 30 is programmed by transmitting commands over address bus 50 and data bus 60. It is preferable that address 50 and data bus 60 be coupled to the address and data busses of a central processing unit (CPU). The CPU controls the transform generator by transmitting commands to program the internal registers of address multiplexer 30. The CPU also supplies transform data for storage in LUT 10. Clock and control signals 55 are provided for CPU interface. The internal registers may be memory mapped into the CPU address space, or alternatively, the internal registers may be mapped in the CPU I/O space.

Address multiplexer 30 has four programmable registers that control access to LUT 10. The four programmable registers are the following:

MASK—This register is used to dynamically modify the number of banks of memory comprising LUT 10. In the current embodiment, LUT 10 is comprised of 128K bytes of memory. By programming the MASK register, this memory may, for example, be configured as 1 bank of 128K, or 2 banks of 64K, or 4 banks of 32K, or 8 banks of 16K, or 16 banks of 8K. Numerous other programmed bank configurations are possible. For both LUT loading and live data transformation, this register is pre-programmed to set the bank select bits that are transmitted to bank select 70 by mask logic 35.

ADDRESS SELECT—This register is programmed to set the access mode of LUT 10. The access modes include random access mode, auto-increment mode, and live data mode.

BIT WIDTH—This register is programmed to set the width of the data stored in LUT 10.

BASE ADDRESS—This register is programmed with the starting address for loading LUT 10 in auto-increment mode.

Functionality of the transform generator of the present invention is divided into two areas; LUT loading, and live data transformation. LUT 10 may be accessed in any of three addressing mode: random access mode, auto-increment mode, and live data mode. The random access and auto-increment access modes are used to load transform data into LUT 10 in order to implement one or more predefined transfer functions. During random access and auto-increment modes, the LUT can be dynamically configured into one or more banks for storing transform data for one or more functions.

To select the random access mode of address multiplexer 30, the ADDRESS SELECT register is programmed to select random access mode, and the MASK register is programmed to set the desired number of bank bits and bank bit settings in order to configure LUT 10. During random access mode, input buffer 32 receives a random address over address bus 50. Input buffer 32 transfers the random address to mask logic 35, which transmits address 72 and bank select 70 to LUT 10. Mask logic 35 splits the received random address into address 72 and bank select 70 in accordance with the pre-programmed settings in the MASK register. Mask logic 35 transmits the pre-programmed bank bit settings to bank select 70, and transmits the received random address to address 72, unmodified. In the case of a LUT 10 load operation in random access mode, data received over data bus 60 is transferred to LUT data 75 through bidirectional buffer 20. Alternatively, LUT 10 is read by transferring LUT data 75 to data bus 60 through bidirectional buffer 20.

The auto increment mode can be used to simplify system software for loading transform data into LUT 10. During auto increment mode, updated LUT 10 addresses are automatically generated by address multiplexer 30, thereby obviating the need for system software running on the CPU to generate updated addresses. Moreover, auto increment mode speeds loading of transform data into LUT 10, since updated addresses need not be externally supplied.

To select auto increment mode, the ADDRESS SELECT register is programmed to select auto increment mode, and the MASK register is programmed to set the desired bank bits for access to LUT 10. Additionally, the BASE ADDRESS register is programmed with the starting address for the data block, and the BIT WIDTH register is programmed for the width of data in the transform data block. The programmed base address is stored in increment register 36. During auto increment mode, input buffer 33 transfers the contents of increment register 36 to mask register 35, which transmits address 72 and bank select 70 to LUT 10. Mask logic 35 splits the received base address into address 72 and bank select 70 in accordance with the pre-programmed contents of the MASK register. Mask logic 35 transmits the pre-programmed bank bit settings to bank select 70, and transmits the base address received from increment register 36 to address 72 unmodified. During an auto increment load sequence, data received over data bus 60 is transferred to LUT data 75 through bidirectional buffer 20. Upon each subsequent LUT 10 access, increment register 36 updates the stored base address according to the pre-programmed contents of the BIT WIDTH register.

During live data transformation, the digitized input signal received on live data 40 is used to address LUT 10, with the contents of LUT 10 at the addressed location providing the digitized output signal 75 according to the predefined transfer function. During LUT 10 loading, transform data for different transfer functions may be stored in different banks of LUT 10. Thereafter during live data transformation, the transform function can be quickly changed by reprogramming the MASK register to switch LUT 10 banks.

To perform live data transformation, the MASK register is programmed to set the appropriate bank bits for accessing the desired function stored in LUT 10, and the ADDRESS SELECT register is programmed to select live data mode. During live data transformation, live data 40 is received by input buffer 31 and transferred to mask logic 35, which transmits address 72 and bank select 70 to LUT 10. Mask logic 35 splits the received live data 40 into address 72 and bank select 70 in accordance with the pre-programmed contents of the MASK register. Mask logic 35 transmits the pre-programmed bank bit settings to bank select 70, and transmits the received live data 40 to address 72 unmodified. In the current embodiment of the present invention, live data 40 may be any width up to 16 bits. Address 72 and bank select 70 comprise a 17 bit address and a one bit bank select. The remaining 2 bits, one address and one bank select, can be used as bank select bits which are randomly set based upon user requirements. Moreover, if live data 40 is less than 16 bits wide, the unused bits may be used as additional bank select bits by programming the MASK register to set the unused bits.

Figure 2:
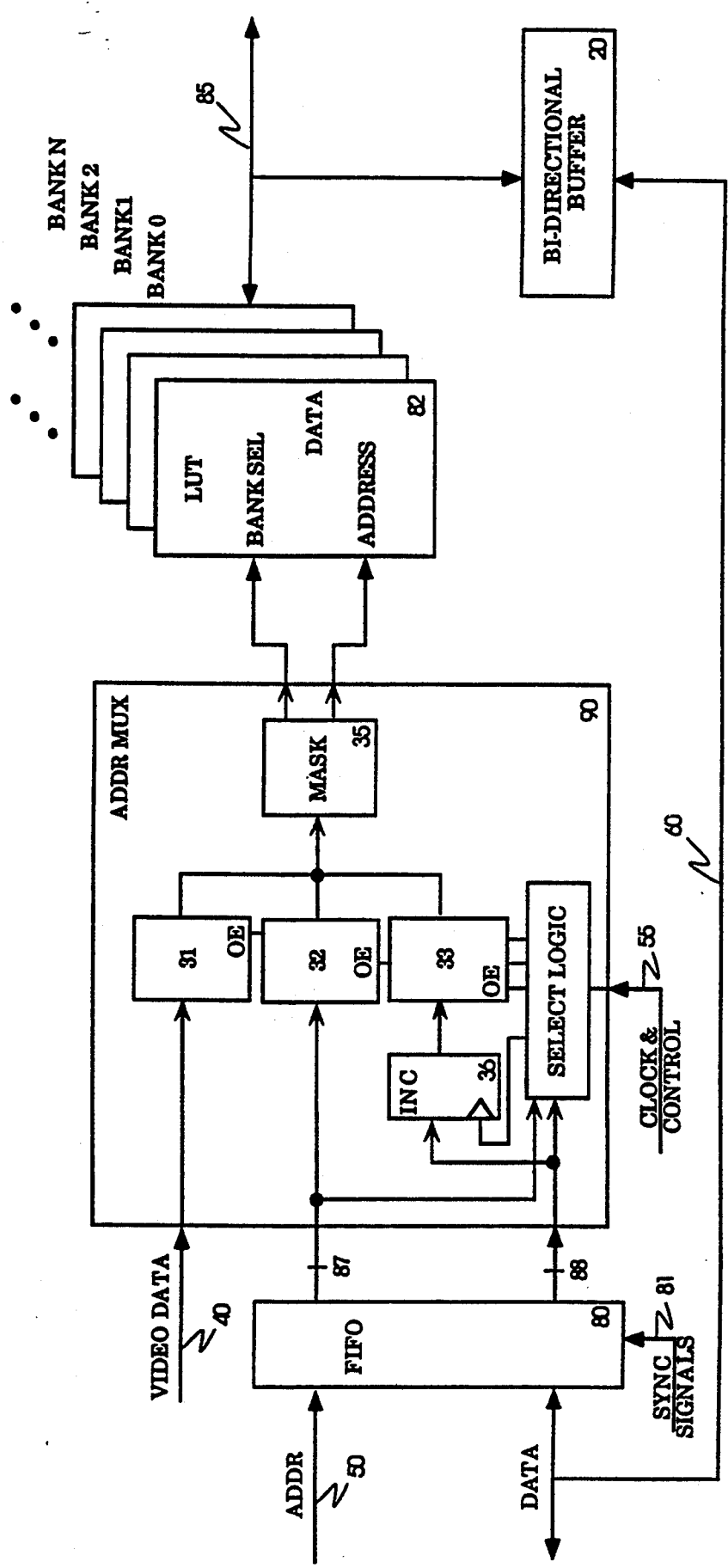
FIG. 2 is an alternative embodiment of the transform generator of the present invention that allows non-intrusive interaction to reconfigure the lookup table without affecting output data.

An alternative embodiment of the present invention provides a circuit for non-intrusive interaction which allows reconfiguration of LUT 10 without affecting live data transformation. This feature is particularly useful in computer graphics applications. FIG. 2 provides a block diagram of the alternative embodiment of the present invention that provides for non-intrusive interaction. The alternative embodiment is similar to the above discussed embodiment, with the addition of first in first out memory (FIFO) 80. FIFO 80 is coupled to address bus 50 and data bus 60. During live data transformation, FIFO 80 buffers transform generator programming commands and transform data corresponding to a new transfer function or functions. This feature allows a CPU to transmit a program command and transform data sequence to the transform generator at any time without affecting live data transformation.

FIFO 80 receives sync signals 81 which indicate when the system is undergoing an interval wherein output data 85 is not used. During this interval FIFO 80 transfers its contents to address multiplexer 90 over signal lines 87 and 88. Since FIFO 80 is a first in first out memory, addresses are transferred over signal lines 87 in the same order as addresses were received over address bus 50, and data is transferred over signal lines 88 in the same order as was received over data bus 60. In this manner, FIFO 80 loads the buffered transform data into unused banks of LUT 82.

This alternative embodiment of the present invention is particularly useful in image processing systems. For example, in a video system, sync signals 81 indicate when the display is undergoing a vertical blanking interval. During the vertical blanking interval FIFO 80 loads data into unused banks of lookup table 82 without affecting the display image. Address multiplexer 90 can then be programmed to switch the newly loaded bank into the live data path as discussed with the previous embodiment.

The present invention has application for use in image processing environments and may be incorporated into a variety of data processing circuitry. Although the present invention has been described in conjunction with the embodiments illustrated in FIGS. 1 and 2, it is evident that numerous alternatives, modifications, variations and uses will be apparent to those skilled in the art in light of the foregoing description.

What is claimed is:

1. A non linear transform generator for selectively transforming a digitized input signal into a digitized output signal in accordance with a plurality of functions, each function represented by a set of transform data, said transform generator switching said functions in real time, comprising:

memory means for storing said sets of transform data in a series of memory locations, each of said memory locations having an address and a stored transform data value such that said stored transform data value equals a function of said address, said memory means receiving said digitized input signal and generating said digitized output signal;

multiplexer means for selectively partitioning said memory means into a plurality of banks, said multiplexer means receiving said sets of transform data and selectively storing said sets of transform data in said banks;

means for selectively switching between said functions by selectively accessing said banks of stored transform data according to a transfer function select command.

2. The non linear transform generator defined by claim 1, wherein said multiplexer means comprises:

first buffer means coupled to receive said digitized input signal, said first buffer means for buffering said digitized input signal;

second buffer means coupled to receive a random address, said second buffer means for buffering said random address;

auto-increment buffer means coupled to receive a base address, said auto-increment buffer means for buffering and incrementing said base address;

select logic means coupled to receive a plurality of predetermined parameters and a clock signal, said select logic means for selectively enabling said first buffer means, said second buffer means, and said auto-increment buffer means according to said predetermined parameters.

3. The non linear transform generator defined by claim 2, wherein said memory means comprises random access memory (RAM) means for storing said sets of transform data, said RAM means arranged as a matrix comprised of at least one RAM bank, said RAM means having an address port and a bank select port coupled to an address path, and a data port coupled to a data path.

4. The non linear transform generator defined by claim 3, wherein said means for selectively switching between said functions comprises mask logic means coupled to receive said digitized input signal from said first buffer means, said random address from said second buffer means, and said base address from said auto-increment buffer means, said mask logic means coupled to receive said transfer function select command and transmit a bank select signal to said bank select port.

5. The non linear transform generator defined by claim 4, further comprising bidirectional buffer means for transferring said sets of transform data into said RAM means, said bidirectional buffer means coupled to receive said sets of transform data, said bidirectional buffer means coupled to transmit said sets of transform data to said data port.

6. The non linear transform generator defined by claim 2, wherein said auto-increment buffer means comprises:
increment register means coupled to receive said base address, said increment register means receiving a control signal from said select logic means;
third buffer means coupled to receive said base address from said increment register means and coupled to transmit said base address to said mask logic means.

7. A non linear transform generator for switching transformations of a digitized input signal, said transformations defined by a plurality of functions, each function represented by a set of transform data, comprising:
random access memory (RAM) means for storing said sets of transform data, said RAM means arranged as a matrix comprised of a plurality of RAM banks, said RAM means having an address port and a bank select port coupled to an address path, and a data port coupled to a data path, said RAM means generating a digitized output signal;
multiplexer means coupled to receive said digitized input signal, an address and a plurality of predetermined parameters, said multiplexer means selectively transmitting said digital signal, said address, and an auto-increment address to said memory means over said address path according to said predetermined parameters;
means for selectively loading said sets of transform data into said RAM banks, and for selectively switching transformations, according to said predetermined parameters;
bidirectional buffer means for transferring said sets of transform data into said RAM means, said bidirectional buffer means coupled to receive said sets of transform data, said bidirectional buffer means coupled to transmit said sets of transform data to said data port.

8. The non linear transform generator defined by claim 7, wherein said multiplexer means comprises:
first buffer means coupled to receive said digitized input signal, said first buffer means for buffering said digitized input signal;
second buffer means coupled to receive said address signal, said second buffer means for buffering said address;
auto-increment buffer means coupled to receive said predetermined parameters and said base address, said auto-increment buffer means for buffering and updating said base address;
select logic means coupled to receive said predetermined parameters and a clock signal, said select logic means for selectively enabling said first buffer means, said second buffer means, and said auto-increment buffer means according to said predetermined parameters.

9. The non linear transform generator defined by claim 8, wherein said means for selectively loading said sets of transform data into said RAM banks, and for selectively switching transformations comprises mask logic means coupled to receive said digitized input signal from said first buffer means, said address from said second buffer means, and said base address from said auto-increment buffer means, said mask logic means coupled to selectively transmit over said address path according to said predetermined parameters.

10. The non linear transform generator defined by claim 9, wherein said auto-increment buffer means comprises:
increment register means for generating said auto-increment address, said increment register means coupled to receive said predetermined parameters, said increment register means receiving a control signal from said select logic means;
third buffer means coupled to receive said base address from said increment register means and coupled to transmit said base address to said mask logic means.

11. The non linear transform generator defined by claim 10, wherein said predetermined parameters comprise a first select, a second select, and a third select.

12. The non linear transform generator defined by claim 11, wherein said select logic means enables said first buffer means if said first select is received.

13. The non linear transform generator defined by claim 11, wherein said select logic means enables said second buffer means if said second select is received.

14. The non linear transform generator defined by claim 11, wherein said select logic means enables said auto-increment buffer means if said third select is received.

15. The non linear transform generator defined by claim 14, wherein said predetermined parameters further comprise a bit width and a base address.

16. The non linear transform generator defined by claim 15, wherein said increment register means generates said auto-increment address by adding said base address to said bit width if said control signal is received.

17. The non linear transform generator defined by claim 11, wherein said predetermined parameters further comprise a bank select value.

18. The non linear transform generator defined by claim 17, wherein said mask logic means transmits said bank select value to said bank select port.

19. A non linear transform generator for selectively transforming a digitized input signal into a digitized output signal in accordance with a plurality of functions, each function represented by a set of transform data received from a CPU, said transform generator switching said functions in real time according to commands received from said CPU, comprising:
memory means for storing said sets of transform data in a series of memory locations, each of said memory locations having an address and a stored transform data value such that said stored transform data value equals a function of said address, said memory means receiving said digitized input signal and generating said digitized output signal;
multiplexer means for selectively partitioning said memory means into a plurality of banks, said multiplexer means receiving said sets of transform data and selectively storing said sets of transform data in said banks according to said commands;
means for selectively switching between said functions by selectively accessing said banks of stored transform data according to said commands;
first-in-first-out (FIFO) memory means for buffering said commands and said sets of transform data received from said CPU, said FIFO means receiving a SYNC signal, said FIFO means transferring said commands and said sets of transform data to said multiplexer means if said SYNC signal is received.

20. The non linear transform generator defined by claim 19, wherein said commands comprise an address select, a random address, a base address, and a plurality of predetermined parameters.

21. The non linear transform generator defined by claim 20, wherein said multiplexer means comprises:
first buffer means coupled to receive said digitized input signal, said first buffer means for buffering said digitized input signal;
second buffer means coupled to receive said random address from said FIFO means, said second buffer means for buffering said random address;
auto-increment buffer means coupled to receive said base address from said FIFO means, said auto-increment buffer means for buffering and updating said base address;
select logic means coupled to receive a plurality of predetermined parameters from said FIFO means and a clock signal, said select logic means for selectively enabling said first buffer means, said second buffer means, and said auto-increment buffer means according to said predetermined parameters.

22. The non linear transform generator defined by claim 21, wherein said memory means comprises random access memory (RAM) means for storing said sets of transform data, said RAM means arranged as a matrix comprised of at least one RAM bank, said RAM means having an address port and a bank select port coupled to an address path, and a data port coupled to a data path.

23. The non linear transform generator defined by claim 22, wherein said means for selectively switching between said functions comprises mask logic means coupled to receive said digitized input signal from said first buffer means, said random address from said second buffer means, and said base address from said auto-increment buffer means, said mask logic means coupled to receive said address select signal and transmit a bank select signal to said bank select port.

24. The non linear transform generator defined by claim 23, further comprising bidirectional buffer means for transferring said sets of transform data into said RAM means, said bidirectional buffer means coupled to receive said sets of transform data, said bidirectional buffer means coupled to transmit said sets of transform data to said data port.

25. The non linear transform generator defined by claim 21, wherein said auto-increment buffer means comprises:
increment register means coupled to receive said base address, said increment register means receiving a control signal from said select logic means;
third buffer means coupled to receive said base address from said increment register means and coupled to transmit said base address to said mask logic means.

26. A method for switching between non linear transformations of a digitized input signal, said non linear transformations defined by a plurality of functions, each function represented by a set of transform data, comprising the steps of:
storing each of said sets of transform data in a lookup table, for each of said sets of transform data comprising the steps of;
receiving a select command that allocates an area of said lookup table to said function;
receiving a base address for storing said set of transform data and a bit width indicating the data width for said set of transform data;
storing said set of transform data in said area of said lookup table starting at said base address through a series of sequential addresses, each of said sequential addresses offset by said bit width;
receiving said select command corresponding to one of said functions and accessing said area of said lookup table according to said select command;
receiving said digitized input signal;
addressing said area of said lookup table with said digitized input signal;
transmitting said addressed contents of said lookup table.

27. In an image processing system, a method for switching between non linear transformations of a digitized input signal without affecting an output image, said non linear transformations defined by a plurality of functions, each function represented by a set of transform data, comprising the steps of:
storing each of said sets of transform data in a lookup table, for each of said sets of transform data comprising the steps of;
receiving a select command that allocates an area of said lookup table to said function;
buffering said select command;
receiving a base address for storing said set of transform data and a bit width indicating the data width for said set of transform data;
buffering said base address and bit width;
receiving a SYNC signal indicating that said output image is undergoing a vertical blanking interval;
storing said set of transform data in said area of said lookup table starting at said base address through a series of sequential addresses, each of said sequential addresses offset by said bit width;
receiving said select command corresponding to one of said functions;
buffering said select command;
accessing said area of said lookup table according to said select command;
receiving said digitized input signal;
addressing said area of said lookup table with said digitized input signal;
transmitting said addressed contents of said lookup table.

* * * * *